United States Patent
Ramos et al.

(10) Patent No.: US 10,966,476 B2
(45) Date of Patent: Apr. 6, 2021

(54) METHOD AND SYSTEM FOR EMBROIDERING A GARMENT

(71) Applicant: Bit Me, Downey, CA (US)

(72) Inventors: Veronica Ramos, Downey, CA (US); Alejandro Carrillo, Downey, CA (US)

(*) Notice: Subject to any disclaimer, the term of this patent is extended or adjusted under 35 U.S.C. 154(b) by 0 days.

(21) Appl. No.: 16/592,323

(22) Filed: Oct. 3, 2019

(65) Prior Publication Data

US 2020/0107598 A1   Apr. 9, 2020

Related U.S. Application Data

(60) Provisional application No. 62/741,444, filed on Oct. 4, 2018.

(51) Int. Cl.

| | |
|---|---|
| *B41M 5/00* | (2006.01) |
| *A41D 27/08* | (2006.01) |
| *D06P 5/24* | (2006.01) |
| *G06K 19/06* | (2006.01) |
| *B44C 1/17* | (2006.01) |
| *B41M 5/025* | (2006.01) |

(52) U.S. Cl.
CPC ........... *A41D 27/08* (2013.01); *B41M 5/0256* (2013.01); *B44C 1/1712* (2013.01); *D06P 5/003* (2013.01); *G06K 19/06037* (2013.01)

(58) Field of Classification Search
CPC .... B41M 5/0256; B41M 3/12; B41M 5/0023; B41M 5/38214; B41M 5/0052; B44C 1/1712; D06P 5/003
USPC .............................................. 8/471; 428/354
See application file for complete search history.

(56) References Cited

U.S. PATENT DOCUMENTS

2015/0328871 A1* 11/2015 de Castro ................ D06Q 1/12
156/230

* cited by examiner

*Primary Examiner* — Eisa B Elhilo
(74) *Attorney, Agent, or Firm* — Nixon Peabody LLP

(57) ABSTRACT

The present disclosure provides, in some examples, a method, a system, and a computer program for vectorizing a QR code with an image in an online store or platform, digitizing the QR code with associated image, printing the QR code with the image on a sublimation/heat transfer paper, placing the paper onto a fabric, loading a cutter machine with the fabric, cutting the fabric into a patch with design details of QR code, and placing the patch onto a garment.

12 Claims, 2 Drawing Sheets

METHOD AND SYSTEM FOR EMBROIDERING A GARMENT

CROSS REFERENCE TO RELATED APPLICATIONS

This application claims priority to and the benefit of U.S. Provisional Patent Application No. 61/741,444 filed Oct. 4, 2018, entitled, "Novel Method and System for Embroidering a Garment," the content of which is incorporated by reference herein in its entirety.

FIELD OF THE DISCLOSURE

The present disclosure relates to a method, a system, and a computer program for embroidering a garment, and more particularly to a method, a system, and a computer program for automated embroidering.

BACKGROUND OF THE DISCLOSURE

Quick response ("QR") codes are popular ways to easily search for an image, bitmoji or a variety of other associated items in an online database. For instance, a smartphone needs only to capture an image of the QR code, and it can be associated with a variety of features and services.

SUMMARY OF THE DISCLOSURE

While QR codes may be used to search for an image or bitmoji in an online database, there are no available systems or methods to automatically vectorize and digitize a QR code in a way that can be then printed onto a garment.

The present disclosure provides a method, a system, and a computer program for vectorizing a QR code with an image in an online store or platform, digitizing the QR code with associated image, printing the QR code with the image on a sublimation/heat transfer paper, placing the paper onto a twill fabric, loading a cutter machine with the twill fabric, cutting the twill fabric into a patch with design details of QR code and image/bitmoji, and placing the patch onto a garment. Accordingly, additionally disclosed are garments with QR codes that are incorporated into the garment.

BRIEF DESCRIPTION OF THE DRAWINGS

The accompanying drawings, which are included to provide a further understanding of the disclosure, and the "ATTACHMENT" are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

Figure 1:
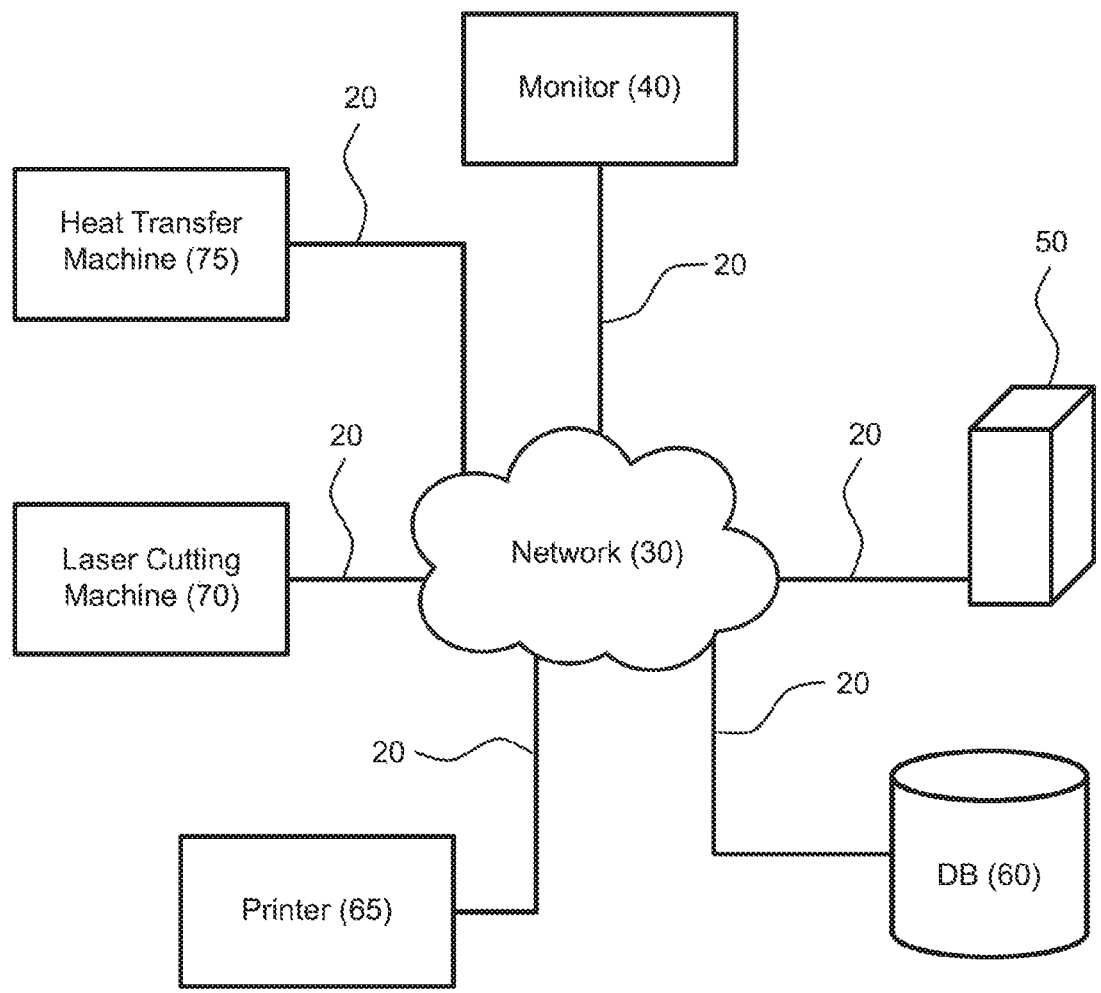
FIG. 1 shows an example of a system constructed according to the principles of the disclosure.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as any person skilled in the art would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure.

A "computer," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a graphics processing unit, a general purpose computer, a cloud, a super computer, a personal computer, a laptop computer, a palmtop computer, a mobile device, a tablet computer, a set-top box, a game console, a notebook computer, a desktop computer, a workstation computer, a server, or the like, or an array of processors, microprocessors, central processing units, graphics processing units, general purpose computers, super computers, personal computers, laptop computers, palmtop computers, mobile devices, tablet computers, set-top boxes, game consoles, notebook computers, desktop computers, workstation computers, servers, or the like.

A "server," as used in this disclosure, means any combination of software and/or hardware, including at least one application and/or at least one computer to perform services for connected clients as part of a client-server architecture. The at least one server application may include, but is not limited to, for example, an application program that can accept connections to service requests from clients by sending back responses to the clients. The server may be configured to run the at least one application, often under heavy workloads, unattended, for extended periods of time with minimal human direction. The server may include a plurality of computers configured, with the at least one application being divided among the computers depending upon the workload. For example, under light loading, the at least one application can run on a single computer. However, under heavy loading, multiple computers may be required to run the at least one application. The server, or any of its computers, may also be used as a workstation.

A "database," as used in this disclosure, means any combination of software and/or hardware, including at least one application and/or at least one computer. The database may include a structured collection of records, data structures in memory, or data organized according to a database model, such as, for example, but not limited to at least one of a relational model, a hierarchical model, a network model or the like. The database may include a database management system application (DBMS) as is known in the art. The at least one application may include, but is not limited to, for example, an application program that can accept connections to service requests from clients by sending back responses to the clients. The database may be configured to run the at least one application, often under heavy workloads, unattended, for extended periods of time with minimal human direction.

A "communication link," as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, 0G, 1G, 2G, 3G or 4G cellular standards, Bluetooth, and the like.

A "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, the cloud network, or the like, or any combination of the foregoing, any of which may be configured to communicate data via a wireless and/or a wired communication medium. These networks may run a variety of protocols not limited to TCP/IP, IRC or HTTP.

A "user," as used in this disclosure means a person, such as, for example, but not limited to, a fashion designer, an artist, an employee, a manager, a publisher, an advertiser, and the like.

A "monitor," as used in this disclosure means a person (such as, for example, a system supervisor, a manager, a designer, a publisher, an advertiser, and the like), an expert system (such as, for example, a computer with artificial intelligence, a neural network, fuzzy logic, and the like), a computer, and the like.

The terms "including," "comprising" and variations thereof, as used in this disclosure, mean "including, but not limited to," unless expressly specified otherwise.

The terms "a," "an," and "the," as used in this disclosure, means "one or more," unless expressly specified otherwise.

The term "garment" may mean an article of clothing onto which a QR code may be embroidered, which includes shirts, pants, underwear, and other clothes.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

A "computer-readable storage medium," as used in this disclosure, means any medium that participates in providing data (for example, instructions) which may be read by a computer. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium may include a "Cloud," which includes a distribution of files across multiple (e.g., thousands of) memory caches on multiple (e.g., thousands of) computers.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G or 4G cellular standards, Bluetooth, or the like.

Overview

The present disclosure provides a method, a system, and a computer program for vectorizing a QR code with an image in an online store or platform, digitizing the QR code with associated image, printing the QR code with the image on a sublimation/heat transfer paper, placing the paper onto a twill fabric, loading a cutter machine with the twill fabric, cutting the twill fabric into a patch with design details of QR code and image/bitmoji, and placing the patch onto a garment. Accordingly, additionally disclosed are garments with QR codes that are incorporated into the garment (e.g. clothing).

In an aspect of the present disclosure, a computer-implemented system for embroidering a garment is disclosed. The computer-implemented system includes a computer that comprises a display, a graphics processing unit, and a microprocessor, the computer programmed to receive at least one QR code with an image and transmit the at least QR code with the image, a server including a central processing unit and a memory, the server configured to receive the at least one QR code with the image from the computer, the memory having the at least one QR code with the image stored therein.

The central processing unit may be programmed to: determine a group of the at least one QR code that is connected with an associated image that is preprogrammed or predetermined based on its association with the at least one QR code; vectorize the received QR code with attached image (e.g., bitmoji/image) through an online store or database using an illustrator software (e.g., adobe illustrator software); digitize the QR code and associated image on the welcome embroidery software; set up a printer to print the QR code with the associated image on a sublimation/heat transfer paper, upload the file created of the QR code with attached image/bitmoji that was digitized with the wilcom software onto a laser cutter machine system, load the laser cutter machine system with a twill fabric, begin cutting the twill fabric into a patch with design details and outline of the QR code with attached image/bitmoji, align the twill fabric patch with the sublimation print of the QR code with attached image/bitmoji, place on a heat transfer machine where the print is transferred onto the twill fabric, place the twill fabric patch/QR code onto a garment via embroidering and/or stitching, and wherein the computer, the laser cutter machine system, the heat transfer machine, and the server are connected to each other via a communication link.

In an embodiment of the present disclosure, the server may include a graphics-processing unit that is configured to execute at least part of the central processing unit's programming.

In another embodiment of the present disclosure, the at least one QR code with an image may include, e.g., a symbol, a logo, a picture, and the like.

The central processing unit may be further programmed to create a mathematical model to calculate the at least one measured relationship between the QR code and the image.

In an aspect of the present disclosure, non-transitory computer readable storage medium tangibly embodying a computer readable program code having computer readable instructions which, when implemented, cause a computer to carry out a plurality of method steps including: receiving at least one item from a user on the computer, and transmitting the at least one item to a central processing unit on a server, wherein the central processing unit is configured to execute the steps including: vectorizing the at least one item with an associated image, digitizing the at least one, printing the at least one item via, e.g., a printer, a cutter machine, a heat transfer machine, and the like.

In an embodiment of the present disclosure, the computer may include a graphics processing unit that is configured to execute a least part of the central processing unit's programming.

In another embodiment of the present disclosure, the user may scan the QR code/barcode to access, e.g., online platform, online store, online database, and the like. Through this access, the user to be able to purchase items, such as, for example, tickets, apparel, sports/work schedules, promotions, charities, fundraising, and the like. The QR code may correspond with a particular online platform or items.

FIG. 1 shows an example of a system 100 constructed according to the principles of the disclosure that provides for automated embroidering of an image. The system 100 includes at least one user computer 10, a network 30, a monitor (e.g., a system manager) computer 40, a server (or computer) 50, a database 60, a sublimation printer 65, a laser cutter machine 70, and a heat transfer machine 75, all of which may be coupled to each other via communication links 20.

The laser cutter machine may include an Epilog laser machine. Additionally, the sublimation printer may be an Epson Artisan 1430 sublimation printer. Also, the embroidery machine may be a Tajima Multi head Embroidery Machine. However, these are just examples, and additional suitable machines may be utilized to carry out the technology of the present disclosure.

Furthermore, the server 50 and database 60 may be connected to each other and/or the network 30 via one or more communication links 20. The user computer 10 and the monitor computer 40 may be coupled to the network 30 via communication links 20. The user computer 10 may be used by, for example, designers, fashion designers, artists, and the like.

The computers 10, 40, server 50, and database 60 may each include a computer-readable medium comprising a computer program that may be executed to carry out the processes disclosed herein. The computer-readable medium may include a code section or code segment for performing each step disclosed herein.

Figure 2:
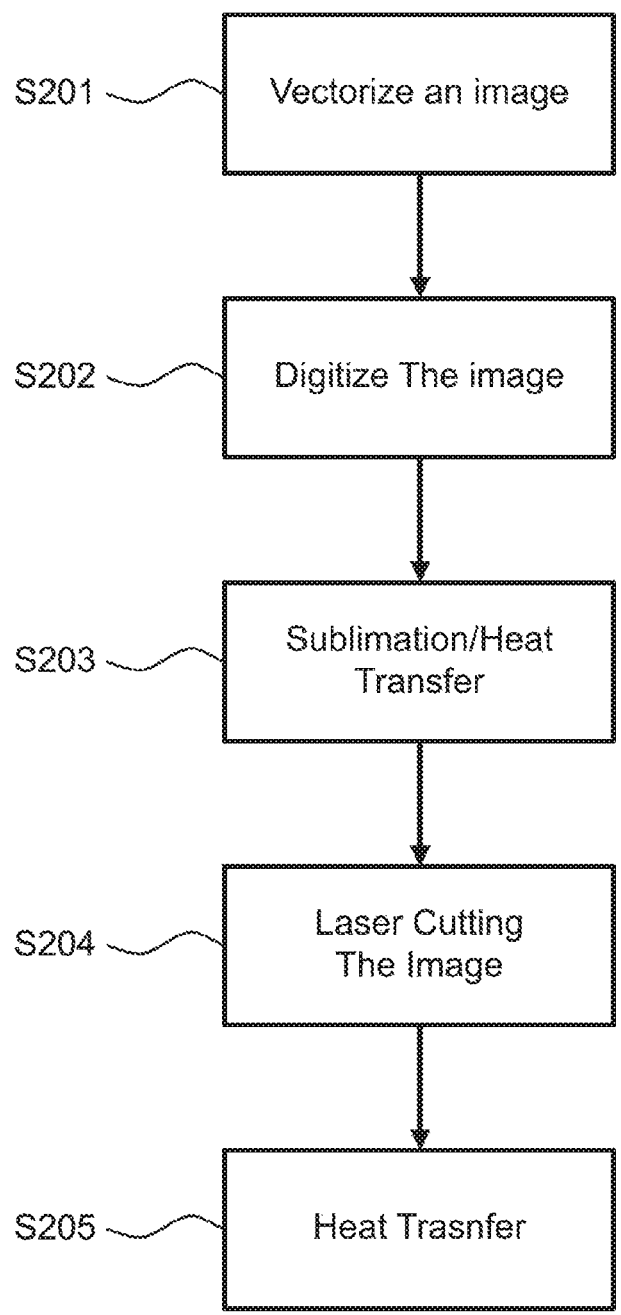
FIG. 2 shows an example of a process for embroidering an image onto a garment that is constructed according to the principles of the disclosure.

FIG. 2 shows an example of a process for automated embroidering of a QR code with an associated image onto a garment. First, a digital file may be received that includes an image of a QR code for attachment to a garment. This could be any suitable data file that could be vectorized or processed in a similar matter so the image is scalable.

Next, the process 200 includes vectorizing the image (S201) of the QR code. This may be performed by any suitable software program, including adobe illustrator. Next, the image may be digitized with a software program (202) to ensure that it is the correct size and dimensions for cutting and stitching of the QR code on a garment. This may be performed using any suitable software.

Next, the image may be printed onto paper or other suitable materials that may be used of transfer the image to a garment. In some examples a sublimation printer may be used to print the image onto sublimation/heat transfer paper (S203) so that the image may be transferred from the paper to the fabric of the garment. This may be performed, however, using any suitable methods and using any suitable materials or fabrics.

Next after the images are printed onto a paper, the paper may be laser cut (S204) or cut using other suitable methods. Additionally, the original image file may be utilized to cut a twill fabric or other fabric that is used to create the patch. The original image file will, in some examples, provide the dimensions of the patch that will need to be cut with the laser cutter. In some examples, the fabric of the patch is a twill fabric.

Next, the printed image on the paper must be heat transferred onto the fabric of the patch (S205). In some examples, first the patch will be aligned with the printed paper. Then, the patch and the paper will be placed in a heat transfer machine where the QR code images will be sublimated or transferred to the will fabric cut patch. For instance, the machine may use a heat press to transfer the image to the fabric of the patch.

Finally, the fabric of the patch must then be attached to the garment using embroidering or any other suitable methods. In some examples, a metallic thread (e.g., black, silver, or gold) is used for the stitching/embroidering process. In other examples, other suitable methods will be utilized to attach the patch to the garment.

In an aspect of the present disclosure, the system may follow client-server architecture. The client-server architecture may include a server computer and a plurality of client computers. The server and client may communicate through a network interface by any known connection protocol, for example, HyperText Transfer Protocol (HTTP). In addition to having a CPU, a memory, and a storage device, the server may save access to database, which may store data, such as, for example, QR code, associated image with the QR code, and the like. A client computer may further include a CPU, a GPU, a memory, and a storage device, as well as a display device (e.g., computer monitors, display screens, virtual reality headsets), an input device (e.g., keyboards, mouses, track-pads, touch screens, microphones, and the like), and a peripheral device. The peripheral device may include, e.g., touchscreen, pen tablet, joystick, scanner, digital camera, video camera, microphone, and the like.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure.

SELECTED EMBODIMENTS

Although the above description and the attached claims disclose a number of embodiments of the present invention, other alternative aspects of the invention are disclosed in the following further embodiments.

Embodiment 1

A method of attaching a QR code to a garment, the method comprising: receiving a digital file with an image of a QR code; vectorising the digital file; printing the image onto heat transfer paper; laser cutting the heat transfer paper to the outline of the image; laser cutting a fabric patch to the outline of the image; aligning the laser cut heat transfer paper and the laser cut fabric patch; heat pressing the aligned heat transfer paper and laser cut fabric to transfer the image to the laser cut fabric patch; and attaching the laser cut fabric patch to a garment.

Embodiment 2

Wherein the garment is a jacket, a shirt, a pair of pants, or a sweater Embodiment 3. Wherein the fabric patch comprises twill fabric.

Embodiment 4

Wherein the image additionally comprises a graphic.

Embodiment 5

Wherein the image additionally comprises a bitmoji.

Embodiment 6

A system comprising garment; and a patch attached to the garment comprising a QR code.

Embodiment 7

Wherein the garment is a shirt, a sweater, or a pair of pants.

Embodiment 8

Wherein the patch comprises twill fabric.

Embodiment 9

Wherein the QR code is a graphic that was heat pressed onto the patch.

Embodiment 10

Wherein attached to the garment comprises embroidered with metal wire.

Embodiment 11

Wherein the QR code is associated with a website on a server and database.

Embodiment 12

Wherein heat pressed further comprises: printing the image on a sublimation paper; and heat pressing the image on the sublimation paper onto the patch.

What is claimed:

1. A method of attaching a Quick response (QR) code to a garment, the method comprising:
   receiving a digital file with an image of a Quick response (QR) code;
   vectorising the digital file;
   printing the image onto heat transfer paper;
   laser cutting the heat transfer paper to the outline of the image;
   laser cutting a fabric patch to the outline of the image;
   aligning the laser cut heat transfer paper and the laser cut fabric patch;
   heat pressing the aligned heat transfer paper and laser cut fabric to transfer the image to the laser cut fabric patch; and
   attaching the laser cut fabric patch to a garment.

2. The method of claim 1, wherein the garment is a jacket, a shirt, a pair of pants, or a sweater.

3. The method of claim 1, wherein the fabric patch comprises twill fabric.

4. The method of claim 1, wherein the image additionally comprises a graphic.

5. The method of claim 1, wherein the image additionally comprises a bitmoji.

6. A system comprising:
   a garment; and
   a patch attached to the garment comprising a Quick response (QR) code.

7. The system of claim 6, wherein the garment is a shirt, a sweater, or a pair of pants.

8. The system of claim 6, wherein the patch comprises twill fabric.

9. The system of claim 6, wherein the Quick response (QR) code is a graphic that was heat pressed onto the patch.

10. The system of claim 6, wherein attached to the garment comprises embroidered with metal wire.

11. The system of claim 6, wherein the Quick response (QR) code is associated with a website on a server and database.

12. The system of claim 9, wherein heat pressed further comprises:
    printing the image on a sublimation paper; and
    heat pressing the image on the sublimation paper onto the patch.

* * * * *